(12) United States Patent
Capozzi

(10) Patent No.: US 9,346,475 B2
(45) Date of Patent: May 24, 2016

(54) BLOCKING END CAP FOR A ROLLING BEARING AND SUPPORTING DEVICE FOR A RAILWAY AXLE EQUIPPED THEREWITH

(71) Applicant: Marco Giovanni Francesco Capozzi, Turin (IT)

(72) Inventor: Marco Giovanni Francesco Capozzi, Turin (IT)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

(21) Appl. No.: 14/485,108

(22) Filed: Sep. 12, 2014

(65) Prior Publication Data

US 2015/0078693 A1    Mar. 19, 2015

(30) Foreign Application Priority Data

Sep. 12, 2013   (IT) .............................. TO2013A0741

(51) Int. Cl.

| F16C 19/38 | (2006.01) |
|---|---|
| F16C 19/54 | (2006.01) |
| B61F 15/12 | (2006.01) |
| B61F 15/26 | (2006.01) |
| B65G 39/04 | (2006.01) |
| F16C 35/063 | (2006.01) |
| B65G 39/10 | (2006.01) |

(52) U.S. Cl.
CPC .................. *B61F 15/26* (2013.01); *B61F 15/12* (2013.01); *F16C 35/063* (2013.01); *B65G 39/04* (2013.01); *B65G 39/10* (2013.01); *F16C 19/386* (2013.01); *F16C 2229/00* (2013.01)

(58) Field of Classification Search
CPC .......... B61F 15/12; B61F 15/26; B61F 15/28; F16C 19/386; F16C 35/063; F16C 2361/31; F16C 2326/10; F16C 19/12; F16C 19/26; F16C 19/54; B65G 39/04; B65G 39/10
USPC ........... 384/456, 459, 89, 571, 584, 586, 489, 384/559, 562–563, 587, 589
See application file for complete search history.

(56) References Cited

U.S. PATENT DOCUMENTS

| 2,901,299 | A | * | 8/1959 | Cramer et al. ................ 384/459 |
|---|---|---|---|---|
| 2,981,574 | A |   | 4/1961 | McNicoll |
| 3,603,655 | A | * | 9/1971 | Keller et al. .................. 384/459 |
| 3,741,614 | A | * | 6/1973 | Judge ............................ 384/459 |
| 3,741,615 | A | * | 6/1973 | Otto .............................. 384/486 |
| 3,833,277 | A | * | 9/1974 | Jones et al. ................... 384/459 |
| 4,819,949 | A | * | 4/1989 | Otto .............................. 277/351 |

(Continued)

FOREIGN PATENT DOCUMENTS

| DE | 102011004030 A1 * | 8/2012 |
|---|---|---|
| WO | WO 0175320 A1 * | 10/2001 |
| WO | WO 2006094031 A1 * | 9/2006 |

*Primary Examiner* — Marcus Charles
(74) *Attorney, Agent, or Firm* — Bryan Peckjian; SKF USA Inc. Patent Dept.

(57) ABSTRACT

A blocking end cap for a rolling bearing in a railway axle box of a supporting device for a railway axle is provided. The cap is shaped as a concave disc delimited by an annular side wall having a symmetry axis (A), a bottom wall arranged transversely to the symmetry axis (A), and an elbow-shaped, annular joining portion, connecting the bottom wall to the side wall. The thickness of the bottom wall measured in a direction parallel to the symmetry axis (A) is continuously variable in the radial direction between a maximum (S1) situated at the symmetry axis (A) and a minimum (S2) arranged at a radially outer edge of the cap defined by the side wall.

11 Claims, 3 Drawing Sheets

(56) References Cited

U.S. PATENT DOCUMENTS

| | | | |
|---|---|---|---|
| 5,462,367 A * | 10/1995 | Davidson et al. | 384/459 |
| 6,272,942 B1 | 8/2001 | Ganser | |
| 6,312,161 B1 * | 11/2001 | Williams | 384/459 |
| 8,596,872 B2 * | 12/2013 | Pruden | 384/480 |

* cited by examiner

BLOCKING END CAP FOR A ROLLING BEARING AND SUPPORTING DEVICE FOR A RAILWAY AXLE EQUIPPED THEREWITH

CROSS-REFERENCE TO RELATED APPLICATIONS

This application claims priority to Italian Patent Application No. TO2013A000741 filed Sep. 12, 2013, which is herein fully incorporated by reference.

FIELD OF THE INVENTION

The present invention relates to an axial blocking end cap for a rolling bearing. The invention further relates to a supporting device for a railway axle provided with axle boxes equipped with such a cap.

BACKGROUND OF THE INVENTION

As known, for example from U.S. Pat. No. 3,741,614, a railway vehicle is supported by a series of railway axles, each of which consists of an axle on which the wheels are fitted; each axle end is supported by a device comprising a railway axle box restrained by means of appropriate suspensions to the railway car. Each axle box comprises a rolling bearing mounted on a reduced diameter end of the axle, named journal. The inner ring of the rolling bearing is mounted and axially locked on the journal of the axle between a shoulder, carried integrally by the axle, and a blocking end cap, which is integrally restrained to the free end of the journal, in particular to a frontal surface thereof, by means of screws.

The blocking end cap is subject to relatively high stresses which may produce elastic deformation by bending. The center of the blocking end cap, which end cap is normally made as a concave disc, deflects towards the journal, while a peripheral outer edge of the cap deflects so as to axially move away from the bearing. These deformations, however small, may create many drawbacks because of the narrow spaces and presence of possible wheel rotation detection devices. Consequently, the blocking end cap is currently made as a relatively rigid element, so as to either limit or avoid deformation, at the cost of a heavy weight of the cap, nowadays less and less acceptable.

SUMMARY OF THE INVENTION

It is the object of the present invention to supply an axial blocking end cap for a rolling bearing, in particular for a railway axle box of a supporting device for a railway axle which has, at the same time, little tendency to deformation and light weight also in the presence of relatively high bending stresses.

Thus, according to the invention, an axial blocking end cap for a rolling bearing and a supporting device for a railway axle are provided having the features disclosed in the appended claims.

BRIEF DESCRIPTION OF THE DRAWINGS

The invention will now be described with reference to the accompanying drawings which illustrate a non-limitative embodiment thereof, in which.

DETAILED DESCRIPTION OF THE INVENTION

Figure 1:
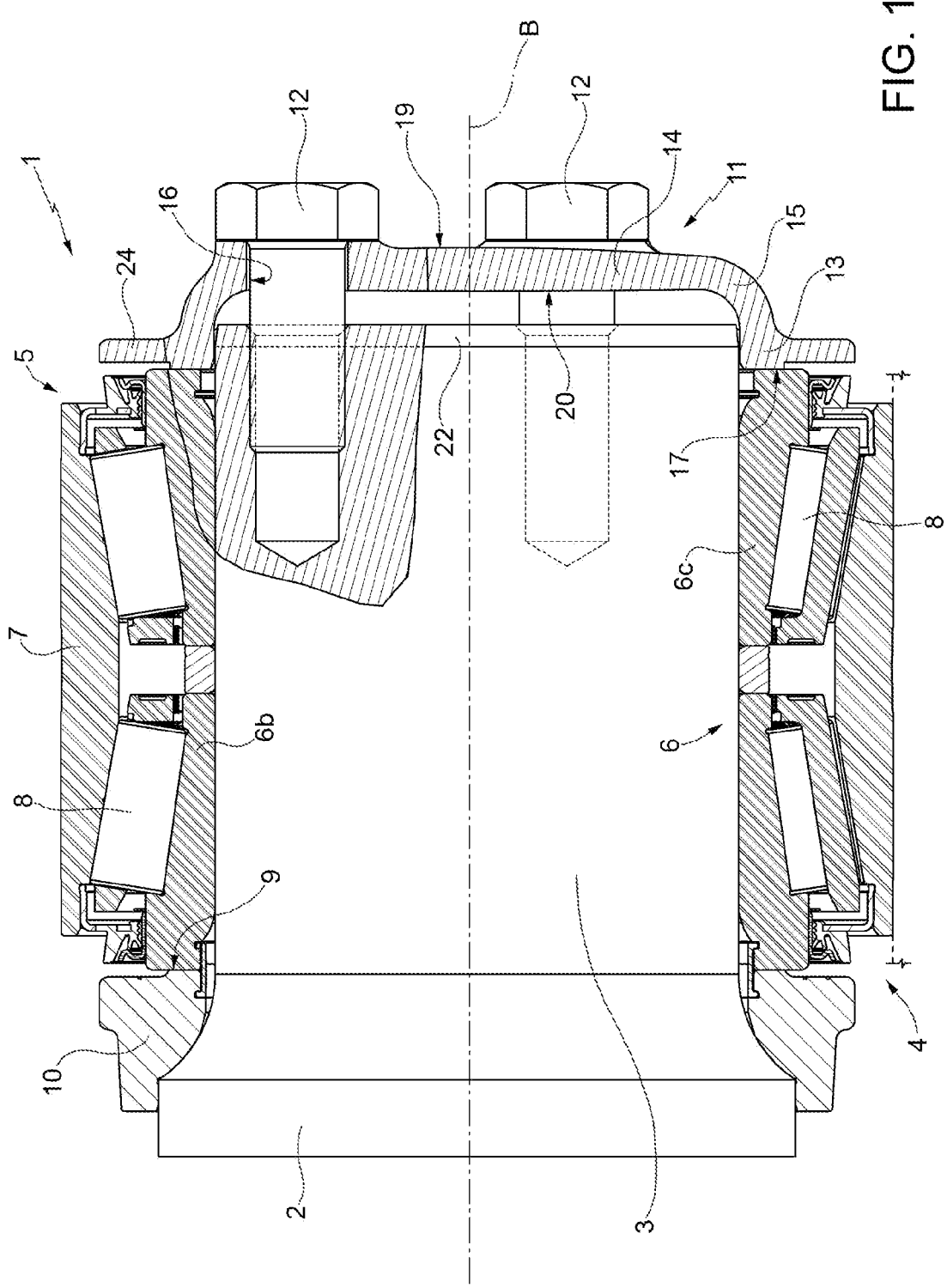
FIG. 1 diagrammatically shows an elevated radial section view of an end of a railway axle and of the respective supporting device made according to the invention.

With reference to FIG. 1, reference numeral 1 refers as a whole to a supporting device of a railway axle 2, illustrated only in part for the sake of simplicity and belonging to an axle shaft (known and not illustrated for the sake of simplicity).

The axle 2 has respective ends 3 of reduced diameter, of which only one is shown for the sake of simplicity, also named journals, each of which is carried by a device 1.

The device 1 comprises at least one railway axle box 4 (of known type and illustrated only in part for the sake of simplicity) comprising, in turn, a rolling bearing 5 mounted on the journal 3 of the axle 2 and comprising an inner ring 6 divided into two ring portions 6b and 6c, an outer ring 7 and, in the illustrated non-limiting example, a double crown of rolling bodies 8.

The inner ring 6 of the rolling bearing 5, with its two ring portions 6b and 6c, is axially mounted blocked on the journal 3 of the axle 2 between an abutment shoulder 9 integrally carried by the axle 2, in the case in point defined by a ring 10, and a blocking end cap 11, integrally mounted on the journal 3 on the side opposite to the ring 10 by means of a series of screws 12, three arranged at 120° in the illustrated example.

Figure 3:
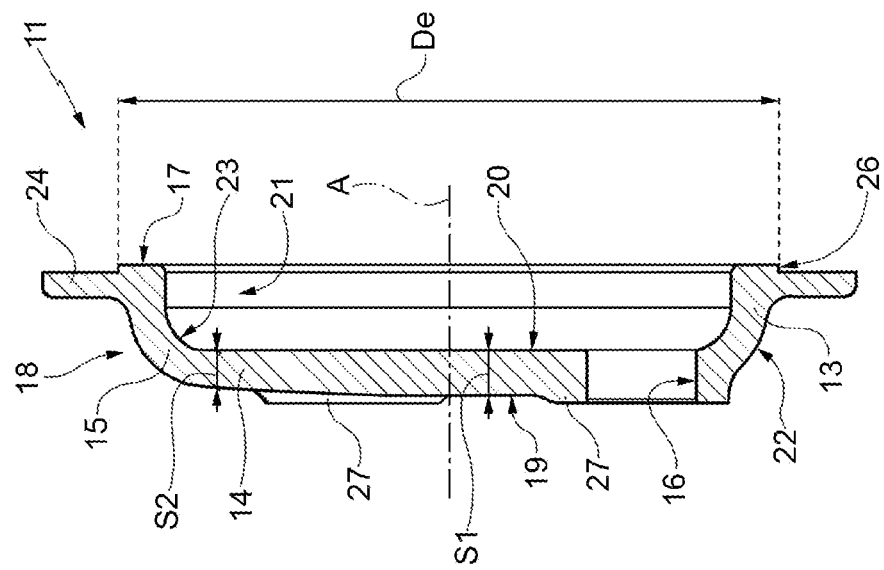
FIG. 3 shows a radial section view taken along a plotting plane III-III of the blocking end cap of FIG. 2.
Figure 2:
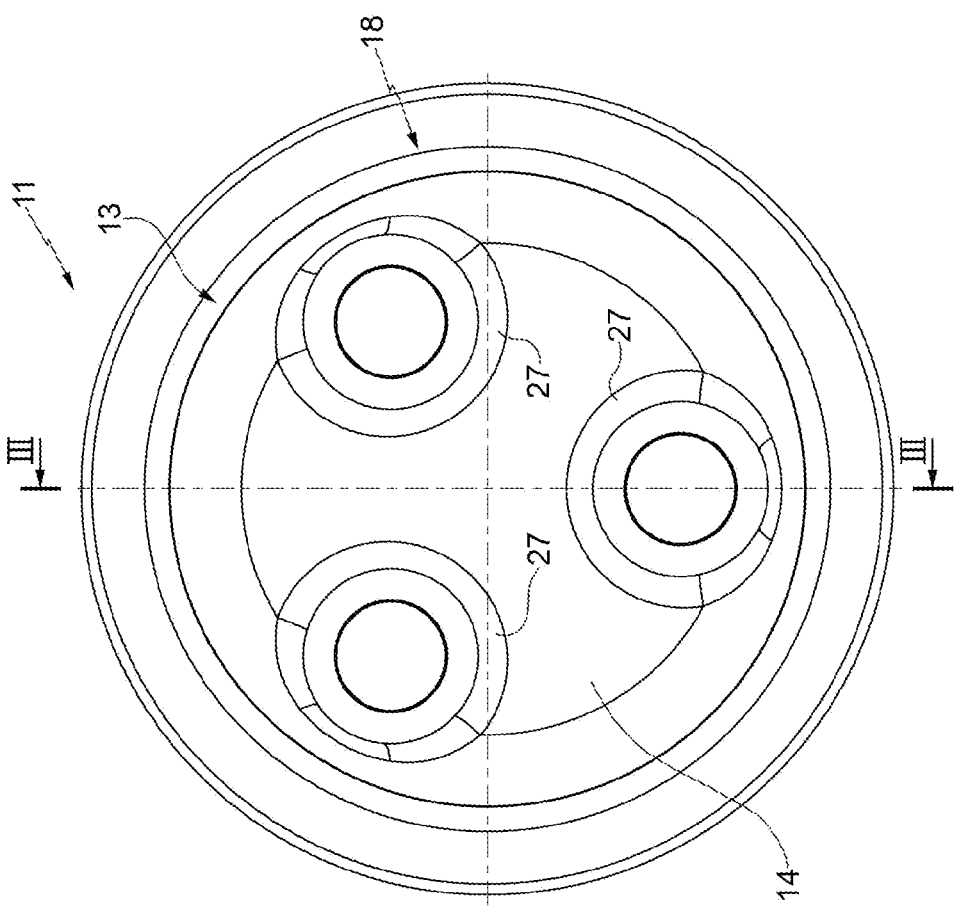
FIG. 2 shows a front elevation view of a blocking end cap for a rolling bearing belonging to the supporting device of the axle in FIG. 1.

With reference also to FIGS. 2 and 3, the blocking end cap 11 for the bearing 5 is shaped as a concave disc delimited by an annular side wall 13 having a symmetry axis A coaxial in use with symmetry axis B of the bearing 5 (FIG. 1), by a bottom wall 14 arranged transversely to the symmetry axis A and by an annular joining section 15, elbow-shaped in radial section, and connecting the bottom wall 14 to the side wall 13.

The bottom wall 14 is provided with a plurality of through holes 16 for the screws 12 for fastening, in use, the cap 11 to the axle 2, and the side wall 13 ends on the side opposite to the bottom wall 14 with a frontal annular surface 17 adapted to abut in use against the ring 6 of the bearing 5.

According to a first aspect of the invention, the thickness of the bottom wall 14 of the cap, measured in a direction parallel to the symmetry axis A, is continuously variable in the radial direction between a maximum thickness S1, situated at the symmetry axis, and a minimum thickness S2, arranged at a radially outer edge 18 of the cap 11 defined by the side wall 13.

In particular, the bottom wall 14 is delimited between an outer frontal surface 19, facing the opposite side of the frontal annular surface 17 of the side wall 13, and an inner frontal surface 20 facing on the same side of the abutting frontal annular surface 17 of the side wall 13, and delimiting, jointly with the side wall 13, an inner concavity or cavity 21 of the cap 11 adapted to couple in use, at least in part, with a free end 22 of the journal 3 of the axle 2.

According to the invention, the outer frontal surface 19 and the inner frontal surface 20 of the bottom wall 14 are not parallel to each other, but converge in radial direction towards each other on the side of side wall 13 and neither are perpendicular to the symmetry axis A. Furthermore, the outer frontal surface 19 and the inner frontal surface 20 of the bottom wall 14 are both curved surfaces, preferably having their center of curvature arranged on the symmetry axis A.

Figure 4:
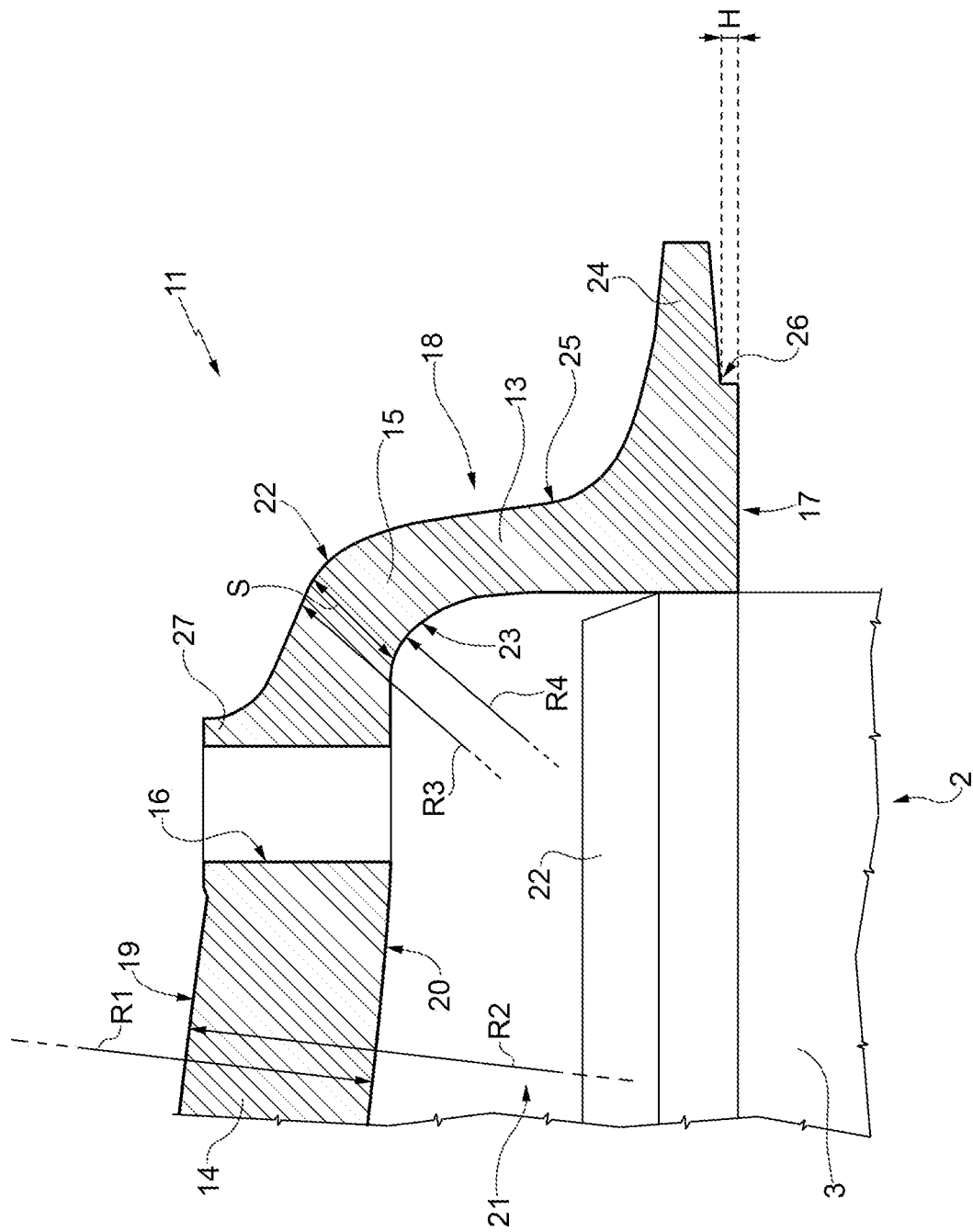
FIG. 4 shows a detail on enlarged scale of the section view in FIG. 3 of the blocking end cap according to the invention.

According to a further aspect of the invention, and with reference in particular to FIG. 4, the inner frontal surface 20 of the bottom wall 14 has a radius of curvature R1 greater by at least one order of magnitude than a radius of curvature R2 of the outer frontal surface 19 of the bottom wall 14. Furthermore, the radius of curvature R2 of the outer frontal surface of the bottom wall is equal to four or five times the measure of a radially outer diameter De of the side wall 13 (FIG. 3).

Furthermore, according to a preferred aspect of the invention, the outer frontal surface 19 and the inner frontal surface 20 of the bottom wall 14 have an opposite curvature. In other words, the radii of curvature R1 and R2 are reciprocally opposite because they have centers of curvature arranged on opposite sides with respect to bottom wall 14. The center of curvature of the radius R1 is arranged beyond the bottom wall 14, on the part opposite to the abutting frontal annular surface 17, while the center of curvature of the radius R2 is arranged on the part of the abutting frontal annular surface 17 and beyond the concavity 21.

Surprisingly, by making the cap 11 according to the dimensional parameters described above, instead of with a bottom wall at constant thickness and with parallel surfaces as in the prior art, allows to reduce the overall weight of the cap 11 thus the bending strength remaining equal, so that the radially outer edge 18 is not appreciably deformed in use under the pressure stress of the screws 12.

Furthermore, in order to obtain an optimal result, the elbow-shaped annular joining portion 15 is delimited, in direction of the thickness of the bottom wall 14, between two curved surfaces 22 and 23 which joint flush in a continuous way to the bottom wall 14 and to the side wall 13; a first radially outer curved surface 22 has a first radius R3 and a second radially inner curved surface 23 has a second radius R4; according to a further aspect of the invention, the first radius R3 has a higher value than the value of the second radius R4 comprised between the value of the second radius R4 increased by half the thickness S of the bottom wall at the joining portion 15 and the value of the second radius R4 increased by the double thickness S of the bottom wall at the joining portion 15, so that the following in equations apply:

$$R3 \geq R4 + \tfrac{1}{2}S \quad (1)$$

$$R3 \leq R4 + 2S \quad (2)$$

The cap 11 has the side wall 13 which is radially provided on the outside with a flange 24 obtained near the frontal annular surface 17 of the side wall 13, but axially removed from the frontal annular surface 17 so as to define on a radially outer lateral surface 25 of the side wall 13 and towards the frontal annular surface 17 an annular step 26, which must measure in the axial direction, according to a last aspect of the invention, a height H either equal to or higher than 2 mm.

Finally, the invention consists in making the bottom wall 14 of the cap 11 which receives, in use, the pressure of the screws 12 with a thickness, measured in a direction parallel to the symmetry axis A, continuously variable in radial direction between a maximum S1 situated at the symmetry axis A and a minimum S2 arranged at the radially outer edge 18 of the cap 11 and in delimiting such a variable thickness bottom wall 14 between an outer frontal surface 19, facing the side opposite to the bearing 5, and an inner frontal surface 20, facing the bearing 5, which are not parallel to each other but are two converging curved surfaces in radial direction one towards the other of the side wall 13 and having a radius of curvature different by at least one order of magnitude, the radius of curvature of the inner frontal surface 20 being greater.

Finally, the cap 11 has, only at holes 16, and on the outer frontal surface 19, thickenings which form flat bulges 27 adapted to receive the heads of the screws 12 in abutting manner. Such bulges 27 are obtained on the bottom wall 14 so as to provide localized thickening of the bottom wall 14 only at the holes 16 and in addition to the general shape of bottom wall 14 as described above. In particular, bulges 27 are obtained on the bottom wall 14 in radial position corresponding to the transition between the end of the bottom wall 14 and the annular joining portion 15 so as to better distribute the stresses caused in use by the screws 12 on the entire cap 11.

The invention claimed is:

1. A blocking end cap for a rolling bearing for installation in a railway axle box of a supporting device for a railway axle, the cap being shaped as a concave disc delimited by an annular side wall having a symmetry axis (A) coaxial, to a symmetry axis (B) of the bearing, by a bottom wall arranged transversely to the symmetry axis (A), and by an elbow-shaped, annular joining portion, connecting the bottom wall to the side wall; the bottom wall being provided with a plurality of through holes for respective screws for fastening, the cap to the axle, and the side wall further comprises a frontal annular surface that faces away from the bottom wall and toward the rolling bearing, the frontal annular surface being spaced from the bottom wall, the frontal annular surface further adapted to abut against a ring of the bearing; wherein
   i) the thickness of the bottom wall measured in a direction parallel to the symmetry axis (A) is continuously variable in the radial direction between a maximum (S1) situated at the symmetry axis (A) and a minimum (S2) arranged at a radially outer edge of the cap defined by the side wall;
   ii) flat bulges are obtained on the bottom wall, only at the through holes thereof, and on an outer frontal surface thereof, which bulges provide thickenings of the cap adapted to receive respective heads of the fastening screws in abutting manner.

2. The cap according to claim 1, wherein the bottom wall is delimited between the outer frontal surface, facing a direction away from the shaft, and an inner frontal surface facing towards the shaft and delimiting, along with the side wall, a concavity of the cap adapted to at least partially couple, with a free end of the axle; the outer frontal surface and the inner frontal surface of the bottom wall being not parallel to each other and radially converging towards each other on the side of the side wall and being both not perpendicular to the symmetry axis (A).

3. The cap according to claim 2, wherein the outer frontal surface and the inner frontal surface of the bottom wall are both curved surfaces.

4. A cap according to claim 3, characterized in that the outer frontal surface and the inner frontal surface of the bottom wall have their center of curvature arranged on the symmetry axis (A).

5. A cap according to claim 3, characterized in that a radius of curvature (R1) of the inner frontal surface of the bottom wall is greater than a radius of curvature (R2) of the outer frontal surface of the bottom wall.

6. A cap according to claim 5, characterized in that the radius of curvature (R2) of the outer frontal surface of the bottom wall is equal to four or five times the measure of a radially outer diameter (De) of the side wall.

7. A cap according to claim 3, characterized in that the outer frontal surface of the bottom wall has a different curvature than the inner frontal surface of the bottom wall.

8. A cap according to claim 7, characterized in that the elbow-shaped annular joining portion is delimited, in the direction of the thickness (S) of the bottom wall, between two curved surfaces which join flush in a continuous way to the bottom wall and to the side wall; a first radially outer curved surface having a first radius (R3) and a second radially inner curved surface having a second radius (R4); the first radius (R3) having a value higher than the value of the second radius (R4) and comprised between the value of the second radius (R4) increased by half the thickness (S) of the bottom wall at the joining portion and the value of the second radius (R4) increased by double the thickness (S) of the bottom wall at the joining portion.

9. A cap according to claim 8, characterized in that the side wall is radially externally provided with a flange axially spaced apart from the annular frontal surface of the side wall so as to define an annular step on a radially outer side surface of the side wall and towards the frontal annular surface, which annular step measures a height (H) equal to or greater than 2 mm in axial direction.

10. A supporting device of a railway axle comprising at least one railway axle box comprising, in turn, a rolling bearing fitted on a smaller diameter end or axle journal of the axle, the inner ring of the rolling bearing being fitted axially blocked on the axle journal of the axle between a shoulder integrally carried by the axle and a blocking end cap shaped as a concave disc delimited by an annular side wall having a symmetry axis (A) coaxial to a symmetry axis (B) of the bearing, by a bottom wall arranged transversely to the symmetry axis, and by an elbow-shaped annular joining portion connecting the bottom wall to the side wall; the bottom wall being provided with a plurality of through holes for respective screws for fastening the cap to the axle, and the side wall further comprises a frontal annular surface that faces away from the bottom wall and toward the rolling bearing, the frontal annular surface being spaced from the bottom wall, the frontal annular surface further cooperates in abutment against an inner ring of the bearing; characterized in that the thickness of the bottom wall of the cap, measured in a direction parallel to the symmetry axis (A), is continuously variable in the radial direction between a maximum (S1) situated at the symmetry axis and a minimum (S2) arranged at a radially outer edge of the cap defined by the side wall.

11. A device according to claim 10, characterized in that the bottom wall of the cap is delimited between an outer frontal surface, facing a direction away from the rolling bearing and an inner frontal surface facing towards the rolling bearing, which outer and inner frontal surfaces are not parallel to each other but are two curved surfaces radially converging towards each other on the side of the side wall, the inner frontal surface having a first radius of curvature that is greater than a second radius of curvature of the outer frontal surface.

* * * * *